Fig. 4

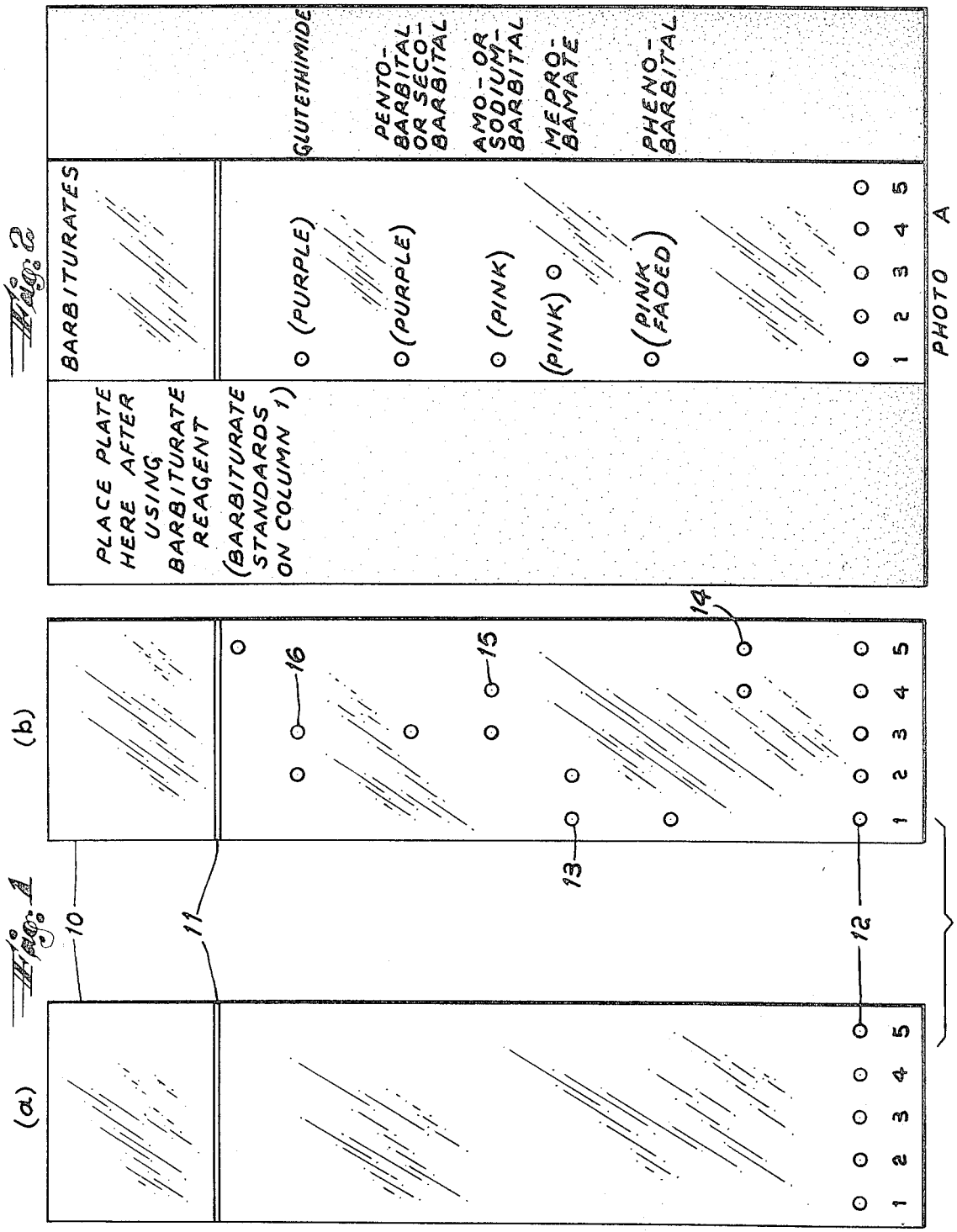

ALKALOIDS

PLACE PLATE HERE AFTER SPRAYING WITH ALKALOID REAGENT (α)

COMPARE WITH COLUMN 3

THEN SPRAY WITH ALKALOID REAGENT (b)

GLUTETHIMIDE WILL BE SEEN ON PHOTOS A AND C

COLUMN 5 WILL TURN BROWN-ORANGE FOR THE NARCOTICS

CHLORPROMAZINE AND CHLORDIAZEPOXIDE WILL BE ORANGE OTHERS WILL NOT REACT

| Substance | 1 | 2 | 3 | 4 | 5 |
|---|---|---|---|---|---|
| DIAZEPAN | | | | | |
| METHADONE OR MEPERIDINE | (RED BROWN) | (RED BROWN) | | | |
| COCAINE OR CHLORPROMAZINE (DARK PURPLE) | (PURPLE) | | | | |
| PROPOXYPHENE OR GLUTETHIMIDE (BROWN) | | (ORANGE) | | | |
| LSD | (BLUE PURPLE) | (PURPLE) | | | |
| QUININE | (LIGHT PURPLE) | (PURPLE) | | | |
| CHLORDIAZEPOXIDE | | | | | |
| CODEINE | (PURPLE) | | | | |
| MORPHINE | (PURPLE) | | | | |

PHOTO C

Fig. 3

AMPHETIMINES

PLACE PLATE HERE AFTER USING AMPHETIMINE REAGENT COMPARE WITH COLUMN 3

THEN SPRAY WITH ALKALOID REAGENT AND COMPARE AGAIN

| Substance | 1 | 2 | 3 | 4 | 5 |
|---|---|---|---|---|---|
| DEXTRO- OR METH AMPHETIMINE | (RED PURPLE) | | | | |
| PHENMETRAZINE | (BLUE) | | | | |

PHOTO B

INVENTOR
DAVID SOHN
BY Richard C. Klein
ATTORNEY

United States Patent Office 3,832,134
Patented Aug. 27, 1974

3,832,134
TLC METHOD AND DEVICE FOR DETECTING THE PRESENCE OF TARGET SUBSTANCES IN UNKNOWN SOLUTIONS
David Sohn, 8 Muriel Ave., Lawrence, N.Y. 11559
Filed Oct. 4, 1971, Ser. No. 186,268
Int. Cl. G01n 31/08, 33/16
U.S. Cl. 23—230 B
5 Claims

ABSTRACT OF THE DISCLOSURE

TLC method and device for testing urine or other body fluids for the presence of target substances. The device includes (1) a thin layer chromatographic plate into which target standards have been incorporated at selected starting points and (2) a photodiagram showing the appearance of a developed plate which had been prepared with the same target standards. Comparison, after development, of the plate to which a test solution had been applied, to the photodiagram verifies the test procedure while also determining the presence or absence of the target substances in the test solution.

BACKGROUND

This invention relates to the testing of body fluids for the presence of certain target substances. It was developed to meet demands made by health, law enforcement and educational officials who were involved with the epidemic of drug abuse currently plaguing our society.

Typical procedures for detecting drug usage by an individual involve the taking of a body fluid (e.g. urine) and sending it to a laboratory for analysis. This procedure is satisfactory where time is not of the essence and when sufficient numbers of samples are taken to achieve the maximum economies offered by a specialized testing laboratory.

Of the several methods of urine testing for the presence of narcotic drugs or for substances such as lactose and quinine which are used in conjunction with such drugs as cutting agents the most widely used is the thin layer chromatographic method. Some articles describing standard techniques are:

1. Mule, S.J.: Determination of Narcotic Analgesics in Human Biological Materials. Analytical Chemistry 36: 1909–1914 (September) 1964.
2. Mule, S.J.: Identification of Narcotics, Barbiturates, Amphetamines, Tranquilizers and Psychomimetics in Human Urine. Journal of Chromatography 39: 302–311 (January) 1969.
3. Davidown, B; Li Petri, N.; and Quame, B.: A Thin-Layer Chromatographic Screening Procedure for Detecting Drug Abuse; American Journal of Clinical Pathology 50: 714–719 (December) 1968.
4. Dole, V.P.; Kim, W.K.; and Eglitis, I.: Detection of Narcotic Drugs, Tranquilizers, Amphetamines, and Barbiturates in Urine. Journal of the American Medical Association 198: 349–352, 1966.

The common point in chromatographic methods is the application of the urine sample and test solutions to a plate coated with a hydroscopic film and the subsequent analysis of the plate to identify the presence or absence of certain target substances. Such plates may be prepared by the method devised by Stahl and Kalterbach (Stahl, E. and Kalterbach, U.; Dunnschicht Chromatographic IX Mitteilung, Schelltrennung von Digitalis-und Podophyllum Glycosidegemischen. Journal of Chromatography 5: 458–460, 1961).

Other methods of urine screening have attempted to simplify the entire process. One such method was devised by Vincent Dole and co-workers which employs cation-exchange paper to which urine is applied and from which drugs are extracted with the application of buffer-solvent solutions. These papers circumvent the need for sending urine samples in liquid form to laboratories, thus avoiding a cumbersome and sometimes messy task. However, the need for the laboratory and the consequent inavailability of instantaneous test results has not been circumvented.

Although the test procedures utilizing chromatographic techniques have been described and used in the literature produce results having a high degree of reliability, the author knows of no such technique simple enough to allow immediate testing of body fluids for the presence of drugs by lay individuals. The principal reason for the lack of such procedures is the extremely complex and tedious preparation of standard solutions and the interpretation of results, both of which are crucial when a high degree of accuracy is to be achieved. Simplified procedures have been devised to test alcohol levels in the bloodstream (e.g. the balloon test) which have played an important role in promoting driver safety. There is an even greater need for testing techniques for drugs both in emergency room treatment and in police activities.

SUMMARY OF THE INVENTION

An object of the present invention is to provide a method of screening body fluids or unknown substances which uses known thin layer chromatographic techniques which can be carried out by a lay person outside a laboratory setting.

Another object of the present invention is to provide a kit utilizing thin layer chromatographic techniques which will allow the screening of body fluids or unknown substances by lay people with substantially the same degree of confidence as if performed by a laboratory technician or physician.

In accordance with my invention thin layer chromatographic plates are prepared in the usual manner with the additional step of applying, in advance, standard compounds at the usual point of application of the unknowns. The standards are then developed along with the unknowns to allow a relatively simple comparison and identification of the unknown. Photographs of developed plates incorporating the same standards are then consulted to assist in the identification. This procedure is applicable to both qualitative and quantitative identifications.

BRIEF DESCRIPTION OF THE DRAWING

The above objects and feature of the present invention will be better understood by reading the following detailed description together with the accompanying drawings in which: FIGS. 1a and 1b are respective plan views of the same thin layer chromatographic plate before and after development prepared in accordance with the present invention. FIGS. 2, 3 and 4 are representations of color photographs, which are used in conjunction with the thin layer plate to identify unknowns in the families of barbiturates, amphetamines and alkaloids respectively.

DESCRIPTION OF THE PREFERRED EMBODIMENT

The following paragraphs will describe a kit plus the methods for performing tests on unknown solutions or substances. The kit described is designed to be used either for routine or emergency testing of the urine of suspected narcotic users in police stations, small infirmaries, hospital emergency rooms, or wherever swift information regarding an individual's involvement with narcotics is required.

The essential portion of the kit is a thin layer chromatographic plate having appropriate standards applied to it in advance. Standards of known drugs may undergo metabolism in the body to metabolites totally different from the original compound. To compare an unmetabolized drug with one which has been metabolized may lead to erroneous conclusion since the metabolite or metabolites may have reactions unlike the original compound. This is true in particular of quinine and of certain phenothiazine derivatives as, for example, thioridazine (Mellaril). For drugs with differing metabolites, the metabolites will be obtained either by biologic or biochemical transformation and applied to the thin layer plate so that true comparisons may be obtained. In all cases the standards will be those substances likely to be present in the body fluid of a drug used. The standards are then developed simultaneously with the unknowns thus permitting a direct comparison. These plates will be described in greater detail after the kit and test procedure is described. Meanwhile one may refer to FIGS. 1a and 1b which illustrate such a plate before and after development. Full color, full size photographs or photodiagrams are provided for point-by-point comparison of the developed standards following the application of the appropriate spray reagents for identification of the drugs present. These photographic aids are illustrated in FIGS. 2, 3 and 4.

A kit incorporating thin layer plates prepared with pre-incorporated standards will now be described. Although specific reagents have been listed, others may be used successfully. Both technical and economic considerations may dictate minor variations from the contents described herein.

CONTENTS

A. Extraction bottle, 125 ml. sealed screw-cap, containing 48 ml. of chloroform, 2 ml. of isopropanol and 2 ml. of borate buffer pH 9.3.

B. Sodium sulfate, anhydrous ($Na_2SO_4$) 5 grams in sealed packet.

C. Acetic acid 10%, 0.1 ml. tube, sealed.

D. Methanol, anhydrous, 10 ml., in sealed tube.

E. 50 microliter syringe or similar sized capillary tubes.

F. Methanol, anhydrous, 50 microliters in sealed dispenser tube.

G. Thin layer chromatographic plates 5 by 20 cm. coated with a 250 micron layer of silica gel G to which standards have been applied (see description).

H. Developing tank-screw cap jar 20 cm. in height by 10 cm. in diameter.

I. Developing solution in sealed 50 ml. jar: ethyl acetate-42.5 ml.; methanol-5 ml.; ammonium hydroxide-2.5 ml.

J. Spray reagents for barbiturates: (a) diphenylcarbazone .01% in acetone and water equal parts; (b) mercuric sulfate .25% om 10% sulfuric acid.

K. Spray reagents for alkaloids: (a) Iodoplatinate solution 0.4% platinum chloride with 12% potassium iodide; (b) Dragendorff solution—0.6% w./v. bismuth subnitrate, 5.2% w./v. potassium iodide, 17.5% w./v. acetic acid.

L. Spray reagent for amphetamines-ninhydrin, 0.1% in acetone. (Note: Spray reagents may be as liquids to be applied by air pressure from spray bottles or may be aerosol spray cans.)

M. Comparison photodiagrams of standards following spraying with proper reagents, (a) for barbiturates, (b) for amphetamines and (c) alkaloids. Note: The above solutions and containers will be numbered, labeled, and color coded to distinguish those for extraction (items A,B,C,D), for application of materials to thin layer plates and for developing (items E,F,G,H, and I), and for spraying (items J,K,L,M). Materials not provided in the kit but which are readily available.

N. 20 ml. syringe with long needle for introducing serum or urine sample into extraction bottle and for removing aqueous phase from extraction bottle.

O. Beaker, 50 ml. for evaporation.

P. Water bath for evaporation.

Q. Short wavelength (254 millimicrons) ultraviolet lamp.

The following numbered steps describe a typical test procedure for using the kit described above.

One: 15 ml. of urine (may be obtained by catheterization) or 5 ml. of serum are added by syringe to extraction bottle (A) with buffer and solvent.

Two: Mixture in extraction bottle is hand shaken for 2-5 minutes.

Three: Mixture is permitted to separate by standing for 5 minutes. (If a suitable centrifuge is available, the mixture may be centrifuged to separate the layers.)

Four: When layers are separated, upper aqueous layer is removed in its entirety with 20 ml. syringe (N).

Five: Anhydrous sodium sulfate (B) is added to chloroform to remove any remaining trapped water.

Six: Chloroform-sodium sulfate mixture is separated by decanting chloroform into beaker (O).

Seven: Acetic acid (C) is added to chloroform to convert amphetamines to salts to prevent their volatilization.

Eight: Beaker with chloroform is placed in water bath and evaporated to dryness under visual observation to prevent "bumping."

Nine: Methanol (D) is added to dried beaker to redissolve extract and concentrate it.

Ten: Developing solution (I) is added to developing tank (H).

Eleven: Beaker is replaced in water bath at an angle to concentrate extracted drugs in one area of beaker.

Twelve: Methanol, 50 microliters (F) is added to beaker to redissolve extract.

Thirteen: Ten microliters of extract are applied with microliter syringe or capillary tubes (E) to two marked spots on each of two thin layer chromatographic plates (G) to which standards have been applied in manufacture.

Fourteen: When applied unknowns have dried (this may be facilitated by an air spray or hair dryer or gentle application of heat over a light bulb), the thin layer plates with unknowns are placed in developing tank, side with unknowns down.

Fifteen: After solvent has risen to 15 cm. line, plate is removed and permitted to dry. (Drying may be facilitated by placing plates in 57° incubator or gentle warming over light bulb.)

Sixteen: One plate is now viewed under ultra-violet light for fluorescence due to quinine and any other fluorescence.

Seventeen: The plate is now sprayed with the barbiturate spray reagents (J, A, B). Diphenylcarbazone (J), (a) is sprayed first followed by heavy spraying of mercuric sulfate (J), (b) to bring our barbiturates in control. Comparison is made with photodiagrams (M), (a) to identify and report barbiturates. The compounds which will have been identified, if present, include the barbiturates and Glutethimide (Doriden), and Meprobamate (Miltown).

Eighteen: The second plate is now sprayed with the Ninhydrin-amphetamine spray reagent (L). It should be compared to photodiagram (M), (B), dextroamphetamine (Dexedrine) and methamphetamine (Methedrine) can now be identified. Ultra-violet irradiation will reveal purple-red or blue spots if amphetamine are present.

Nineteen: The second plate is now sprayed with the alkaloid spray reagents (K).

With Iodoplatinate (K), (a), morphine, codeine, methadone, meperidine (Demerol), propoxyphene (Darvon), pentazocine (Talwin), Quinine, LSD, (from serum only), Diazepam (Valium), Chlorpromazine (Thorazine), Chlordiazepoxide (Librium), and Cocaine may be identified.

Spraying with Dragendorff's solution (K), (b) is used for further confirmation and to bring out other phenothiazine compounds following comparison with photodiagram (M), (c).

The above sequence will identify virtually all of the significant drugs of abuse, particularly in an emergency room type situation. Start to finish, after minimum experience, should be on the order of one hour to an hour and a quarter. The identification can proceed while supportive measures and examination of the patient are taking place. With the step-by-step instructions, color coding, and photodiagrams, the entire process can be performed even in the absence of a trained laboratory technician. In addition, no expensive instrumentation or equipment is necessary. The only piece of equipment not found in the average hospital emergency room or small laboratory is the ultraviolet lamp which costs less than fifty dollars. The setup is readily adaptable to a physicians's office or to a plant clinic.

Definitive identification can be life saving. A case in point is glutethimide (Doriden) overdosage which may be confused with barbiturate intoxication. Unlike the case with barbiturates, glutethimide intoxication is unresponsive to hemodialysis. Castor oil catharsis may save the life of the patient. (See Baron, J.M. and Tritch, D.L.; J.A.M.A. 211: 1012–1013. Feb. 9, 1970.)

Methadone and heroin or morphine overdoses are clinically similar and both respond to nalorphine (nalline). However, the duration of action of methadone is much longer than that of morphine. Treatment for heroin or morphine overdosage may result in the death of the patient whereas proper indentification of the methadone will permit appropriate treatment.

The methods used in the kit are well-documented and accepted methods. They are based, with minor modifications, due to our own experience on those published by Mule, and Davidow, and Dole.

Reference is again made to FIGS. 1a and 1b which show a plate before and after development. The thin layer chromatographic plate 10 is typically prepared by coating a glass plate with a 250 micron layer of silica gel G after the method devised by Stahl and Kalterbach (ibid). The plate 10 is scored with a line 11 to prevent migration of the developing solution above that point. The plates are also equipped with indicia 12 which mark the points where the test solutions may be spotted. In the preferred embodiment the plates measure 5 cm. x 20 cm., and contain five indicia points spaced 1 cm. apart. Standard compounds are applied at the time of manufacture of said plates at indicia points 1, 3, and 5 while the examiner would spot the unknowns at points 2 and 4. The results illustrated in FIG. 1(b) show that the unknowns applied at positions 2 and 4 contain some of the same compounds as the standard solution as illustrated by the match at points 13, 14, 15, and 16.

The standards may comprise any naturally occurring compounds as steroids, 17-Ketosteroids, proteins, lipoproteins, sugars, lipids, Amino Acids, and Imidazoles as well as for pharmaceuticals and pharmacologic agents including the drugs of abuse, poisons and pesticides.

In a kit for drugs of abuse, the standards would typically comprise the following in the respective categories:

I. Barbiturates: A mixture of pentobarbital, phenobarbital, amobarbital or secobarbital and glutethimide.

II. Ampehtamines: A mixture of dextroamphetamine, methamphetamine, and phenmetrazine (Preludin).

III. Tranquilizers and psychomimetics: LSD, diazepam (Valium), chlorpromazine, amitriptyline (Elavil), the analgesic, propoxyphene (Darvon), and cocaine.

IV. Alkaloids: would include codeine, morphine, meperidine (Demerol), methadone, quinine, and pentazocine (Talwin).

On each plate, Group I, Group II and III, and Group IV might be applied separately, at concentrations of the order of 1 to 1 micrograms per ml. of methanol, at appropriate intervals to alternate with an unknown applied in duplicate with 1 cm. intervals between each substance spotted.

These mixtures would separate on development and could be sprayed without interfering or obscuring each other so that proper identification could be made. Confirmation may be obtained by repeating the procedure from step 13 on with the exception that the unknown is applied both at the unknown position as well as over the corresponding point of application for the previously applied standard. Comparison of the superimposed unknown with the standard would confirm identification.

Where metabolites are required as standards, these may be obtained naturally from human or animal extracts or by duplication of the process in the body—i.e., acetylation or deacylation, glucuronidation, deamination, carboxylation or decarboxylation, methylation or demethylation.

In order to simplify positive identification of target substances photodiagrams are employed. Three have been illustrated in FIGS. 2, 3, and 4 which are respectively employed to test for barbiturates (photo A), amphetamines (photo B), and narcotics and psychomimetics (photo C). The test plate is placed over the marked portion of the appropriate photodiagram so that a side by side comparison can be made.

It should be apparent that other features and advantages are inherent in this method and apparatus which will allow its use wherever simplified test procedures are required. While the specific application described herein is to identify drugs of abuse in the body fluids of an individual, similar benefits are afforded to the entire field of chromatographic testing. For example, this method would be readily adaptable to the screening for hereditary metabolic diseases which is currently a matter of great national concern. Therefore this invention is not to be limited to the specifics of the disclosure, but to the following claims.

I claim:

1. A thin layer chromatographic method for detecting the presence of a target substance in a test solution containing one or more unknown substances while simultaneously obtaining verification of the test procedure comprising the steps of:
   (a) applying the test solution to a first set of starting points on a thin layer chromatographic test plate, which had during its preparation one or more target standards applied at a second set of starting points thereon;
   (b) chromatographically developing said test plate to produce a migration of both the target standards and the unknown substances across the test plate to form spots indicative of the identity of the applied substances;
   (c) comparing the spots formed by the migration of the target standards and the unknown substances across said test plate to identify the unknown substances in said test solution; and
   (d) both verifying the test procedure and completing the identification of the unknown substances in the test solution with the use of photodiagrams of a properly developed thin layer plate which had been prepared with the same target standards and in the same manner as said test plate.

2. A method as set forth in claim 1 wherein said first set of starting points is the same as the second set of starting points so that proper development will yield a substantial superimposition of spots when an applied unknown substance is the same as a target standard.

3. A method as set forth in claim 1 wherein said target standards comprise metabolized substances such as might be found in body fluid.

4. A thin layer chromatographic test device for screening test solutions for the presence of one or more target substances, said device comprising a thin layer chromatographic plate having target standards incorporated at selected points within an absorbent layer, said points comprising the starting positions for migration of substances through said absorbent layer during development of said plate; at least one photodiagram of a fully developed plate including the same target standards; whereby comparison between said photodiagram and said thin layer chromatographic plate, after development thereof, will both aid in identification of unknown substances, when such are applied to said plate at other points comprising starting points for migration, and validate the development procedure upon a finding that the spots formed by migration of said developed target standards across said plate during development correspond to those shown in said photodiagram.

5. A test device as claimed in claim 4 wherein said target standards comprise metabolized substances such as might be found in a body fluid.

References Cited

UNITED STATES PATENTS 3,540,850  11/1970  Halpaap _____ 23—230 B

MORRIS O. WOLK, Primary Examiner

S. MARANTZ, Assistant Examiner

U.S. Cl. X.R.

23—253 R, 253 TP; 73—61.1 C; 210—31 C